(12) United States Patent
Basha et al.

(10) Patent No.: US 12,304,534 B2
(45) Date of Patent: May 20, 2025

(54) BRAKE ASSEMBLY AND METHOD FOR OPERATION OF SAID ASSEMBLY

(71) Applicant: Transportation IP Holdings, LLC, Norwalk, CT (US)

(72) Inventors: Salim Basha, Bangalore (IN); Munishwar Ahuja, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 163 days.

(21) Appl. No.: 17/360,962

(22) Filed: Jun. 28, 2021

(65) Prior Publication Data
US 2021/0403057 A1   Dec. 30, 2021

Related U.S. Application Data

(60) Provisional application No. 63/045,434, filed on Jun. 29, 2020.

(51) Int. Cl.
| | | |
|---|---|---|
| B61H 1/00 | (2006.01) | |
| B61H 13/20 | (2006.01) | |
| B61H 15/00 | (2006.01) | |
| F16D 49/16 | (2006.01) | |
| F16D 65/28 | (2006.01) | |
| F16D 65/52 | (2006.01) | |

(Continued)

(52) U.S. Cl.
CPC .............. B61H 1/00 (2013.01); B61H 13/20 (2013.01); B61H 15/0007 (2013.01); F16D 49/16 (2013.01); F16D 65/28 (2013.01); F16D 65/52 (2013.01); F16D 2121/04 (2013.01); F16D 2121/14 (2013.01); F16D 2125/64 (2013.01)

(58) Field of Classification Search
CPC ...... B61H 1/00; B61H 13/20; B61H 15/0007; F16D 49/16; F16D 65/28; F16D 65/52; F16D 2121/04; F16D 2121/14; F16D 2125/64
See application file for complete search history.

(56) References Cited

U.S. PATENT DOCUMENTS 2,083,910 A * 6/1937 Hedgcock ................ B61H 1/00
188/58
2,086,840 A * 7/1937 Aurien ................... B61H 13/20
188/56

(Continued)

FOREIGN PATENT DOCUMENTS

| RU | 2106272 C1 | 3/1998 |
|---|---|---|
| RU | 2572796 C1 | 1/2016 |
| RU | 2573100 C1 | 1/2016 |

OTHER PUBLICATIONS

Federal Institute of Industrial Property, Search Report Issued in Application No. 202191481, Dec. 16, 2021, 5 pages. (Submitted with Partial Translation).

*Primary Examiner* — Xuan Lan Nguyen
(74) *Attorney, Agent, or Firm* — K&L Gates LLP

(57) ABSTRACT

Various systems and methods for braking a vehicle are provided. In one embodiment, a brake assembly is provided that includes a lever attachment interface pivotally coupled with two degrees of freedom to a joint between a first lever and a second lever and a brake cylinder coupled to the first lever and designed to engage and disengage a brake lining in a brake component. The brake cylinder includes a slack adjuster configured to adjust a throw of the second lever.

14 Claims, 7 Drawing Sheets

(51) Int. Cl.
  *F16D 121/04*    (2012.01)
  *F16D 121/14*    (2012.01)
  *F16D 125/64*    (2012.01)

(56) References Cited

U.S. PATENT DOCUMENTS

| | | | | |
|---|---|---|---|---|
| 2,159,366 | A | * | 5/1939 | Baselt ................... B61H 13/20 |
| | | | | 188/56 |
| 3,624,766 | A | * | 11/1971 | Sander ............... B61H 15/0028 |
| | | | | 188/56 |
| 4,402,388 | A | * | 9/1983 | Wosegien ............. F16D 65/568 |
| | | | | 188/56 |
| 4,766,980 | A | * | 8/1988 | Engle ...................... F16D 65/56 |
| | | | | 188/206 R |
| RE33,207 | E | * | 5/1990 | Brodeur ................. B61H 15/00 |
| | | | | 188/153 D |
| 6,039,158 | A | * | 3/2000 | Fox ......................... B61H 1/00 |
| | | | | 74/625 |
| 6,116,382 | A | | 9/2000 | Deramaux et al. |

\* cited by examiner

BRAKE ASSEMBLY AND METHOD FOR OPERATION OF SAID ASSEMBLY

CROSS-REFERENCE TO RELATED APPLICATION

The present application claims priority to U.S. Provisional Application No. 63/045,434, entitled "BRAKE ASSEMBLY AND METHOD FOR OPERATION OF SAID ASSEMBLY", and filed on Jun. 29, 2020. The entire contents of the above-listed application are hereby incorporated by reference for all purposes.

BACKGROUND

Railway brake systems have utilized braking riggings to amplify braking force using leverage from linkage connecting a braking cylinder to brake shoes. As brake use progresses, brake shoe wear correlates to the brake's actuation throw. Brake delays may result from the increased brake throw.

Certain brake systems utilize manually operated slack adjustors configured to decrease the wheel-shoe gap. As such, the slack adjustor may be periodically adjusted to decrease the wheel-shoe gap as the brake shoe's lining diminishes over time. Manual reconfiguration of the slack adjustor may necessitate stoppage (e.g., temporary decommissioning) of the railway vehicle utilizing the braking system.

BRIEF DESCRIPTION

In one example, a brake assembly is provided that includes a lever attachment interface pivotally coupled with two degrees of freedom to a joint between a first lever and a second lever. The brake assembly further includes a brake cylinder coupled to the first lever and designed to engage and disengage a brake lining in a brake component. The brake cylinder further includes a slack adjuster configured to adjust a throw of the second lever.

DETAILED DESCRIPTION

Embodiments of a brake rigging for a vehicle (e.g., a rail vehicle) are described herein. The brake rigging includes a joint pivotally coupled between a first and second lever. To allow the joint to achieve more compliant movement with regard a line of action of an actuation force, the joint is coupled to a lever attachment interface with two degrees of freedom. The two degrees of freedom of interface kinematics may be achieved, in one example, via pins mated with bushings or other rotational mechanisms allowing the joint to rotate about two separate axes. Designing the attachment interface with two degrees of freedom allows the efficiency of the torque transfer through the brake rigging to be correspondingly increased by more closely aligning the line of action of the actuation force with a tangent of an arc of the second lever. Using a brake rigging with an attachment interface having two degrees of freedom may be particular desirable in a brake rigging with a lever having a relatively large throw during actuation, such as in a brake system with an automatic slack adjuster. In such an example, the parasitic force components in the rigging may be significantly reduced due to the attachment interface's pivotal adaptability. Increasing the attachment interface's freedom of movement reduces the likelihood of brake lock and conversely increases brake reliability. In this way, the brake rigging can achieve greater efficiency and robust operation.

Further, in one example, the brake rigging may include an automatic slack adjuster in a brake cylinder designed to adjust the brake rigging's actuation throw as a brake lining in a brake shoe wears. Consequently, the manual slack adjustment process may be avoided and vehicle maintenance downtime may be decreased, if desired.

Figure 1:
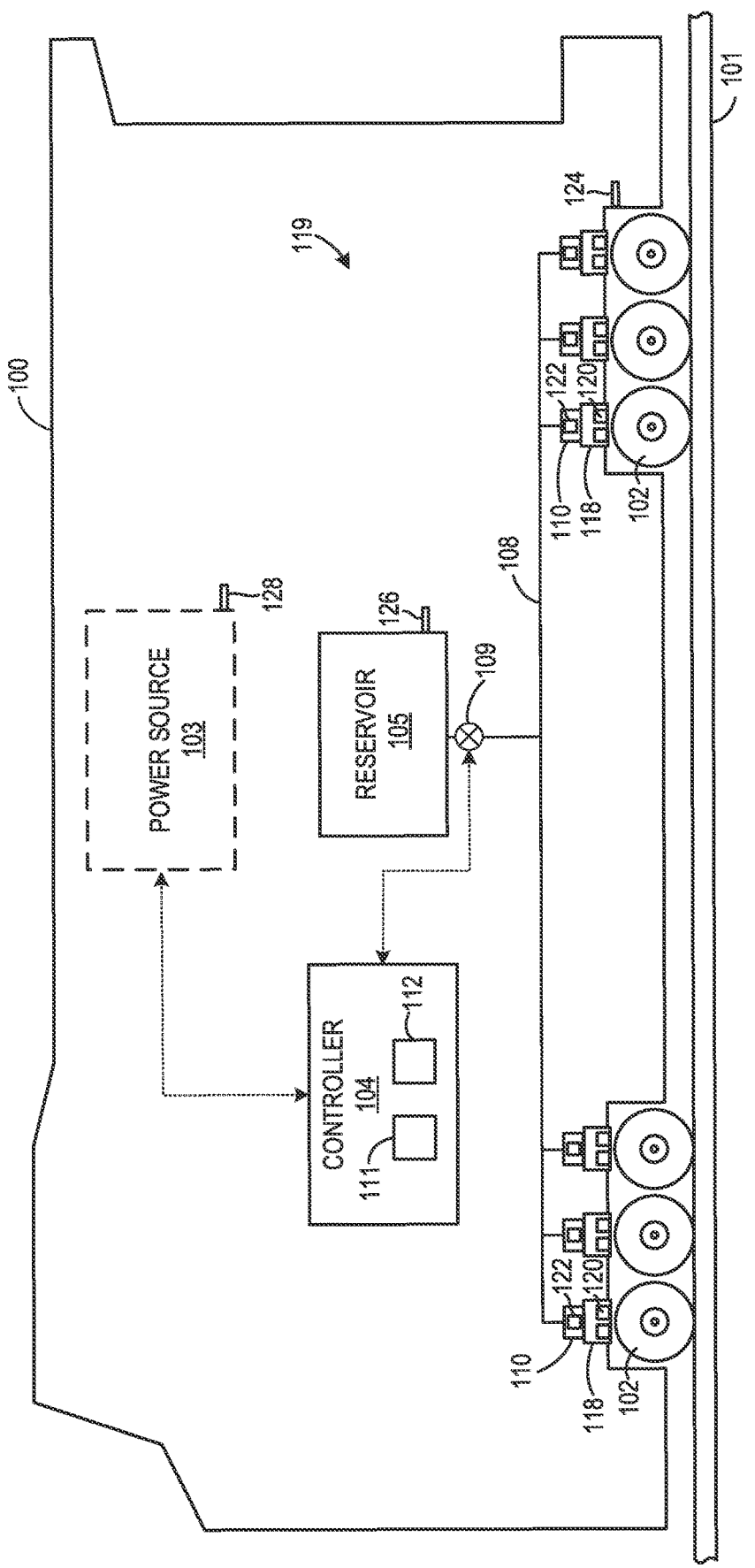
FIG. 1 shows a schematic depiction of a rail vehicle and a brake system.

FIG. 1 shows a schematic depiction of an embodiment of a rail vehicle 100 (e.g., railcar, locomotive, railroad car pulled by a locomotive, rail-road vehicle, and/or other rail vehicle or combinations thereof) configured to travel on a rail 101 via a plurality of wheels 102. As described herein, a rail includes a track or other suitable path along which a wheel 102 of the rail vehicle 100 travels and interfaces with. As such, the device may be used in different operation environments where the vehicle may be traveling along one or more tracks.

As depicted, the rail vehicle 100 may include a power source 103. However, in other embodiments, the power source 103 may be omitted from the vehicle. The power source 103 may include an engine designed to combust fuel such as diesel. In other non-limiting embodiments, the engine may additionally or alternatively combust fuel including gasoline, kerosene, natural gas, biodiesel, alcohol, hydrogen, combinations thereof, etc. through compression ignition and/or spark ignition. To achieve the fuel combustion functionality, the engine may include conventional components such as cylinders, an intake system, an exhaust system, a fuel delivery system, valves, and the like. Additionally or alternatively, the power source 103 may include an electric motor. For instance, in one use-case embodiment, the rail vehicle 100 may be a diesel-electric vehicle. In such an embodiment, the engine may be coupled to an electric power generation system, which may include an alternator/generator, electric traction motors coupled to the wheels 102, etc. For example, the engine may be a diesel and/or natural gas and/or hydrogen engine that generates a torque output that may be transmitted to the alternator/generator which may be mechanically coupled to the engine. In yet another use-case example, the rail vehicle 100 may be an electric locomotive. Still further in other examples, the rail vehicle 100 may not include the motive power source 103 and may be pulled by a locomotive or other suitable rail vehicle.

As depicted in FIG. 1, the rail vehicle 100 further includes a brake system 119. The brake system 119 may be designed for pneumatic brake actuation and therefore may include a reservoir 105 storing pressurized air and/or other suitable gases. Although, a single reservoir 105 is depicted in FIG. 1, the brake system 119 may include multiple reservoirs, in other embodiments. Providing multiple air reservoirs in the system increases redundancy in the system but may increase the system's manufacturing cost. Pneumatic conduits 108 may route the pressurized air between the reservoir 105 and brake cylinders 110. A valve 109 in the brake system 119 may be provided to enable the air pressure delivered to the brake cylinders 110 to be augmented. The valve 109 may include conventional components such as springs, stems, housings, chambers, etc., to enable air pressure adjustment in the system.

The brake system 119 is depicted with one brake cylinder 110 per wheel 102. However, other system arrangements may be used, in other embodiments. Thus, in an alternate example, the system may include brake cylinders designed to actuate multiple wheel brakes. The brake cylinders 110 may be coupled to brake assemblies 118 (e.g., brake riggings) designed to engage and disengaged brake components 120 (e.g., brake shoes) in the assembly, described in greater detail herein with regard to FIGS. 2-6. To elaborate, the brake assemblies 118 may include linkage, pivots, levers, etc. designed to distribute braking forces from the brake cylinders 110 to the brake components 120. When the brake components 120 are engaged, brake linings in the components frictionally engage the wheels 102. Although, the brake assemblies 118 and the brake cylinders 110 as well as their components are schematically depicted in FIG. 1, the cylinders and brake assemblies have greater structural complexity, described in greater detail herein.

When the brakes are applied, air from the reservoir 105 may move through to the pneumatic conduits 108 to the brake cylinders 110 to engage the brake assemblies and push brake components 120 (e.g., brake shoes) in the assembly against the wheels 102. Furthermore, in some embodiments, the brake cylinders 110 may be configured to adjust the engagement slack by decreasing the wheel-shoe gap as the shoes wear over time using an automatic slack adjuster 122 that may be integrated into the cylinder. The automatic slack adjuster 122 may, in some cases, include a ratcheting mechanism designed to ratchet a pushrod of the brake cylinder 110 outward as the brake shoes wear. However, other automatic slack adjustment mechanisms may be used, in other examples, such as a screw type slack adjuster. Additionally, in some embodiments, the brake assemblies 118 may be designed for manual actuation.

The rail vehicle 100 may further include a controller 104. The controller 104 may be configured to control various components related to the rail vehicle 100. As an example, various components of the vehicle system may be coupled to the controller 104 via a communication channel or data bus. In one example, the controller 104 includes a computer control system. The controller 104 may additionally or alternatively include memory 111 holding any known computer readable storage media (e.g., as random access memory, read only memory, keep alive memory, non-transitory memory, etc.) including code for enabling on-board monitoring and control of rail vehicle operation. Thus, the code stored in the memory 111 is executable by a processor 112. In some examples, the controller 104 may include more than one control units, each in communication with one another. The controller 104 may be configured to control various actuators based on signals from sensors and/or other vehicle systems.

The controller 104 may receive information from a plurality of sensors and may send control signals to a plurality of actuators. The controller 104, while overseeing control and management of the brake system 119 and/or rail vehicle 100, may be receive signals from a variety of vehicle sensors, as further elaborated herein, in order to determine operating parameters and operating conditions, and correspondingly adjust various engine actuators to control operation of the brake system 119 and/or rail vehicle 100. For example, the engine controller 104 may receive signals from various engine sensors including, but not limited to, a vehicle speed sensor 124 (e.g., wheel speed sensor), reservoir pressure sensor 126, power source speed sensor 128, and the like). Correspondingly, the controller 104 may control the brake system 119 and/or the rail vehicle 100 by sending commands to various components such as power source 103, the valve 109, brake cylinders 110, and the like. For example, the controller 104 may receive a brake request from a brake interface (e.g., lever, control panel, graphical user interface (GUI), and the like) and responsive to receiving the request adjust an actuator in the brake system 119 to induce brake engagement. However, in other non-limiting examples more automated braking control strategies may be deployed. For instance, the controller may automatically generate a braking command based on a difference between actual and intended vehicle speed and command the brake system accordingly. The other controllable components in the rail vehicle 100 may function through the use of actuators in a similar manner. Additionally or alternatively, the brake assemblies 118 may be manually actuated by an operator. For instance, the brake system 119 may include a hand wheel or other suitable manual input device (e.g., lever, pedal, and the like) configured to manually engage/disengage braking action in the system.

Axis system 150 is provided in FIG. 1 as well as FIGS. 2-11, to establish a common frame of reference. In one example, the z-axis may be parallel to a vertical axis (e.g., gravitational axis), the x-axis may be a lateral axis, and the y-axis may be a longitudinal axis. However, other orientations of the axes may be used, in other examples.

Figure 2:
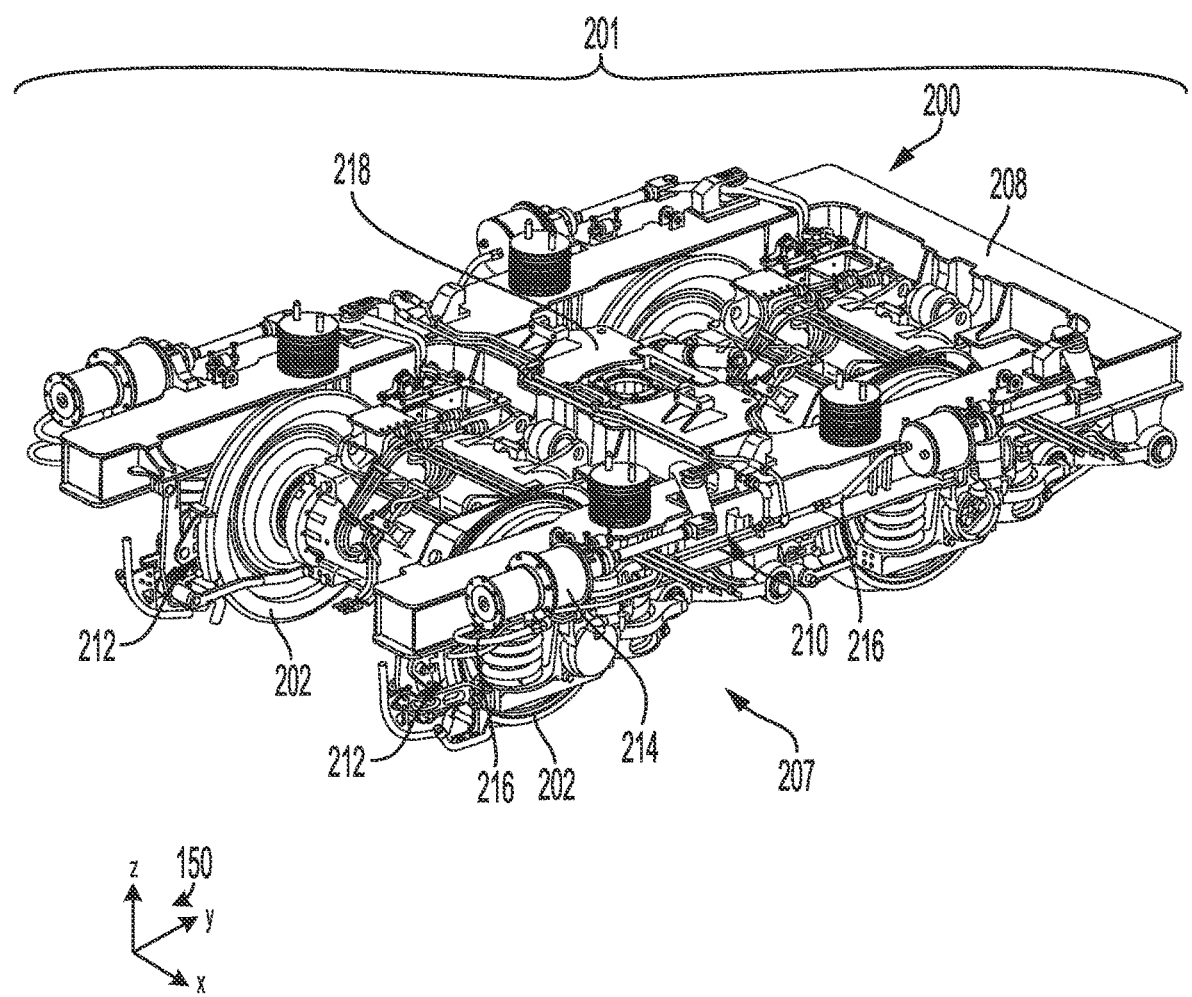
FIG. 2 shows a perspective view of a first embodiment of a brake assembly in a rail vehicle.

FIG. 2 shows a perspective view of an embodiment of a bogie 200 that provides a foundation for a rail vehicle 201. However, other rail vehicle configurations with different support configurations have been envisioned. The rail vehicle 201 includes a brake system 207. The rail vehicle 201 shown in FIG. 2 and the corresponding systems and components serve as examples of systems and components that may be included in the rail vehicle 100, illustrated in FIG. 1. As such, the structural and functional features of the rail vehicle systems and components in FIGS. 2-8 may be included in the rail vehicle 100 of FIG. 1 or vice versa. The example of the bogie 200 illustrated in FIG. 2 contains four wheels 202, though in other examples the bogie 200 may include a different number of wheels (e.g., two wheel, six wheels, eight wheels, etc.).

The bogie 200 may include a frame 208. Additionally, in the illustrated example, in the brake system 207 of the rail vehicle 201 each wheel 202 has its own brake assembly 210 (e.g., brake rigging) designed to engage and disengage wheel braking. However, in other examples, some of the wheels may forgo braking assemblies or at least a portion of the brake assemblies may be designed to actuate brake components (e.g., brake shoes) on multiple wheels.

The brake assemblies 210 may each include a brake cylinder 214. Pneumatic lines 216 in the brake system 207 provide pressurized air or other suitable gas to the brake cylinders 214 to engage/disengage brake components 212. The brake assemblies 210 are described in greater detail with regard to FIGS. 3-8.

The bogie 200 may include other parts such as motors located behind each wheelset, a suspension system coupled to the frame, mounts for attaching containers, flatbeds, passenger quarters, and the like. The frame 208 of the bogie 200 may include a bogie transom 218 extending between longitudinally aligned frame sections. However, numerous suitable frame 208 arrangements may be used. The configuration of the frame 208 may be selected based on a variety of factors such as expected bogie loads, axle arrangement, passenger or cargo container configuration, and the like. The bogie transom 218 which may lie in the middle of the frame 208 serves as a cross-member of the bogie 200. However, in other examples the bogie may have multiple bogie transoms.

Figure 3:
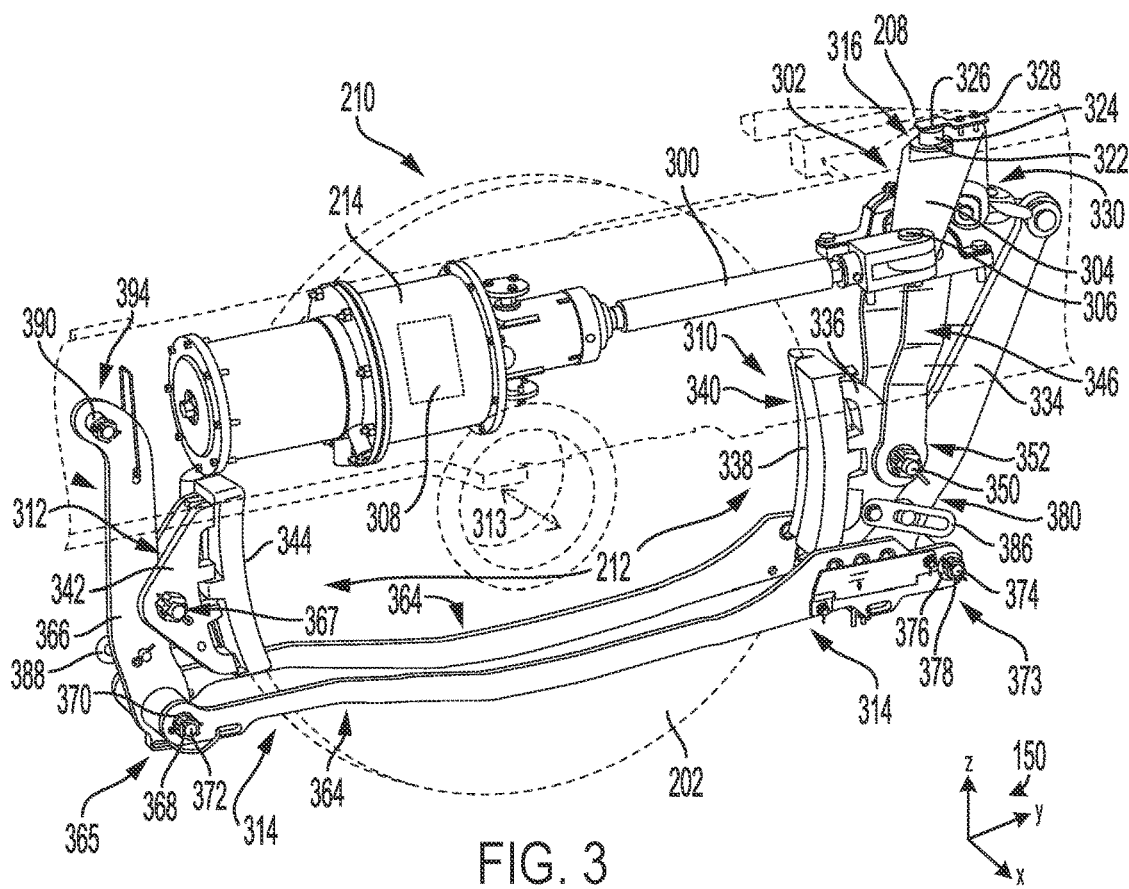
FIGS. 3-4 show detailed views of a section of the brake assembly, depicted in FIG. 2.
Figure 4:
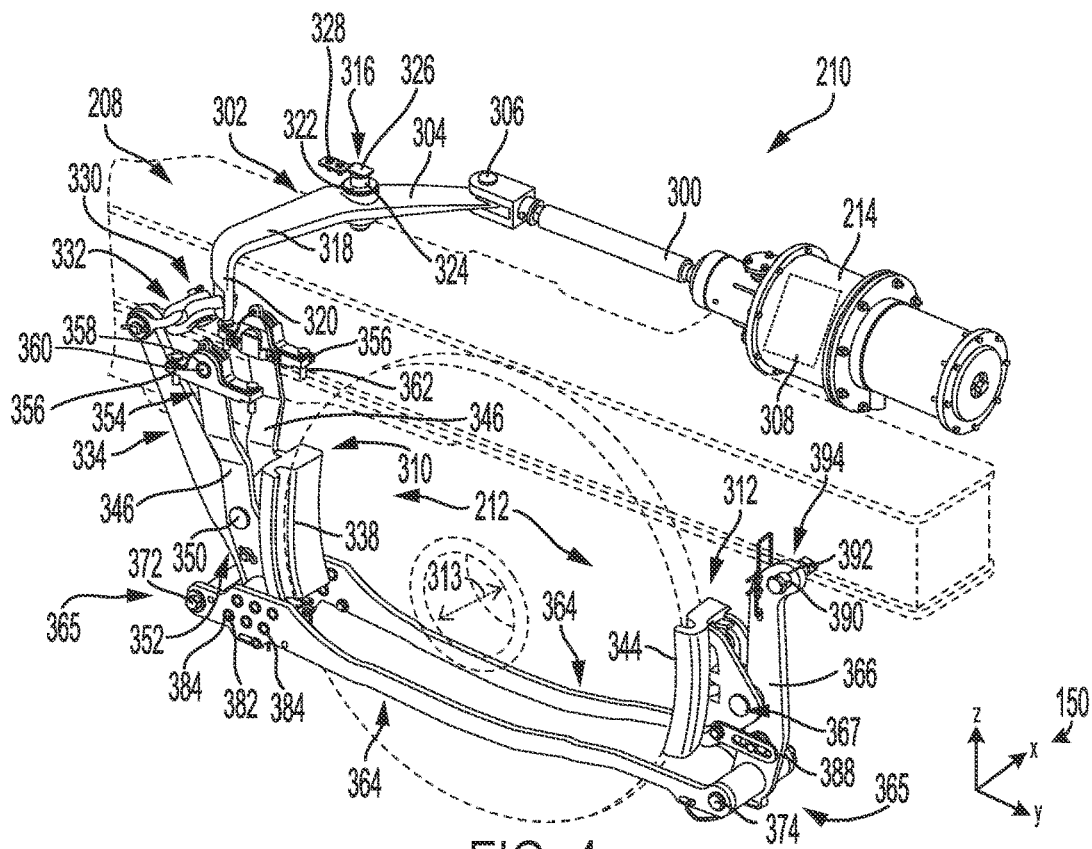

FIGS. 3-4 illustrate different perspective views of the brake assembly 210 in a disengaged configuration. In the illustrated example, the brake cylinder 214 of the brake assembly 210 is again shown. The brake cylinder 214 may be designed to receive pressurized air or other suitable gas via pneumatic lines. Thus, the brake cylinder 214 may include valves and ports, configured to receive the pressurized air. Responsive to pressure changes in the pneumatic conduit the brake cylinder 214 advances and retracts a pushrod 300. The pushrod 300 may be pivotally coupled to a first lever 302 (e.g., live lever) at a first section 304 by a pin 306 or other suitable attachment mechanism such as a bearing. Additionally, in one example, the brake cylinder 214 may include an automatic slack adjuster 308, schematically illustrated in FIGS. 3-4, integrated therein. The automatic slack adjuster 308 may be designed to move the pushrod 300 away from a body of the brake cylinder 214 as the brake components 212 (e.g., brake shoes) in the brake assembly 210 wear. For instance, the automatic slack adjuster 308 may include a ratcheting mechanism moving the pushrod 300 further outward away from a body of the brake cylinder 214 as the brake shoes in the assembly wear. In this way, the throw in the brake assembly 210 occurring during actuation may be kept within a desired range, thereby reducing delays in braking caused by comparatively large wheel-shoe gaps. In one use-case example, the brake cylinder 214 may be designed to extend up to 250 millimeters (mm) for slack adjustment. Additionally, in such a use-case example, the brake cylinder 214 may extend up to an additional 100 mm during brake actuation. Consequently, the throw of a second lever 334 (e.g., cross-over lever) in the brake assembly 210, discussed in greater detail herein, may be relatively high when compared to a brake cylinder without a slack adjuster. However, brake cylinders designed with different amounts of slack and brake actuation extension (e.g., less than 350 mm or greater than 350 mm) have been envisioned.

The brake components 212, in the illustrated example, include a first brake component 310 and a second brake component 312 positioned on opposing sides 314 of the wheel 202. A rotational axis 313 is provided in FIGS. 3-4 as well as FIGS. 5-6, for reference. However, the plurality of brake components may have another suitable arrangement and/or may include an alternate number of components, in other examples. The arrangement and number of brake components may be selected based factors such as packaging goals, desired braking force, wheel arrangement, and the like.

In the illustrated embodiment, a pivot 316 of the first lever 302 is located in a middle portion of said lever between the first section 304 and a second section 318. However, other arrangements of the pivot 316 along the first lever 302 may be used, in other examples. The first lever 302 may be conceptually divided into the first section 304, the second section 318, and a third section 320. The third section 320 downwardly extends from the second section 318, in the illustrated example. However, different configurations of the first lever 302 have been envisioned, such as a lever with only two sections arranged at a non-straight angle with regard to one another. The profile of the first lever may be chosen based on packaging goals, the relative position of other components in the brake assembly, material construction of the lever, and the like.

The location of the pivot 316 of the first lever 302 may be selected based on a desired leverage ratio of the first lever 302 as well as packaging constraints, in some cases. The pivot 316, as depicted, includes a bushing 322 and a pin 324 extending there through. In the pins and bushings described herein, for each pin and bushing pair, the pin may have a smaller outer diameter than the inner diameter of the bushing to allow for rotation there between while allowing the pin to be retained in the bushing, in some instances. Other suitable types of pivots may be used, in other examples, such as ball bearings, roller bearings, and/or other suitable types of bearings, which may, however, be costlier and, in some instances, have less durability than the bushing and pin pivot. A plate 326 is further shown in FIGS. 3-4. The plate 326 may serve as an attachment point between the pin 324 and the frame 208. Bolts 328 or other suitable attachment mechanisms (e.g., clamps, screws, adhesives, welds, or combinations thereof) may be used to attach the plate 326 to the frame 208. The plate 326 is shown positioned vertically above the first lever 302. However, arrangements with the plate positioned beneath the first lever are possible.

The third section 320 of the first lever 302 may be pivotally coupled to a lever attachment interface 330. The lever attachment interface 330 may be configured with two degrees of kinematic freedom, enabling the parasitic losses in the brake assembly 210 to be reduced. To elaborate, the lever attachment interface 330 may be pivotally coupled with two degrees of freedom to a joint 332 between the first lever 302 and the second lever 334. The lever attachment interface 330 includes rotational mechanisms with pins and bushings that allow the interface to achieve greater rotational freedom. Degrees of freedom indicate a number of independent variables for defining a position of a body (e.g., component, assembly, system, and the like) in space. Thus, degrees of freedom may include directions of translation and angles of rotation. As such, the lever attachment interface 330 may include two distinct axes of rotation and therefore exhibits two degrees of freedom. The specific arrangement of the components of the lever attachment interface 330 are described in greater detail herein with regard to FIGS. 7 and 8.

The second lever 334 may attach to the first brake component 310 (e.g., brake shoe) having a body 336 and a brake lining 338 frictionally engaging the wheel 202, during brake actuation. To elaborate, the body 336 may include a recessed section 340 profiled to wrap around a flange of the wheel 202, although other profiles have been contemplated. The brake lining 338 may include organic material, semimetallic material, and/or ceramic materials used for the frictional engagement with the wheel 202 during braking. The second brake component 312 may include similar components to the first brake component 310 such as a body 342, braking lining 344, and the like.

A pair of brake body links 346 may be pivotally attached to the body 336 of the first brake component 310 and via a pin 350 at a lower side 352, in the depicted embodiment. However, other suitable attachment devices between the links and the first brake component have been envisioned, such as welds, clamps, and the like. At upper sides 354, the brake body links 346 may be pivotally coupled to the frame 208 of the rail vehicle via braces 356 or other suitable structures. Again, the pivotal connection may be achieved using bushings 358 and pins 360 or other suitable devices such as bearings. The braces 356 may be attached to the frame 208 or other rail vehicle structures using bolts 362 and/or other suitable attachment mechanisms. The body 342 of the second brake component 312 may be pivotally attached to another brake body link 366 via a pivotal connection 367 (e.g., pin and bushing, bearing, and the like).

The brake assembly 210 may further include a pair of lower links 364 connecting the second lever 334 to the brake body link 366. The lower links 364 synchronize actuation of first and second brake components 310, 312 during braking action. The wheel 202, in the FIG. 2, may be axially interposed via the pair of lower links 364. However, one lower link may be provided in the brake assembly, in other examples. The lower links 364 at one side 365 may be rotationally coupled to the brake body link 366 via a bolt 368, a bushing 370, and a pin 372, in FIGS. 3-4, but may additionally or alternatively include other suitable attachment mechanisms such as bearings, in other embodiments. On the opposing side 373 of the lower links 364 the links may be attached to one another using similar devices such as a pin 374, a bushing 376, a nut 378, and the like. A lower end 380 of the second lever 334 may be attached to the lower links 364. To elaborate, a pin 382 and plurality of openings 384 may be provided in the lower links 364 to allow attachment between the lower links and the second lever 334.

The pin 382 and the plurality of openings 384 may function as a manual slack adjuster. For instance, when the brake linings 338, 344 in the first and second brake components 310, 312 have worn down one can manually adjust for the wear by physically reconfiguring the lower links 364 to make up the spatial difference between the brake components 212 and wheel 202. In other words, personnel may manually mate the pin 382 with another one of the openings 384 to decrease the distance between the first brake component 310 and the second brake component 312, thereby decreasing a gap between the first and second brake components 310, 312 (e.g., brake shoes) and the wheel 202, referred to as a wheel-shoe gap. However, in other examples, the manual slack adjustment feature may be omitted from the brake assembly 210.

A slotted plate 386 may attach the first brake component 310 to the second lever 334. Likewise, another slotted plate 388 may guide the movement of the second brake component 312 in relation to the brake body link 366. The slotted plates 386, 388 allow the brake components 212 to be guided along a desired path during actuation such that the components align with the wheel 202 as actuation unfolds. Additionally, the brake body link 366 may be pivotally attached to a structural component in the rail vehicle, such as the frame 208, via a pin 390 that extends through an opening 392 at an upper side 394 of the link.

Figure 5:
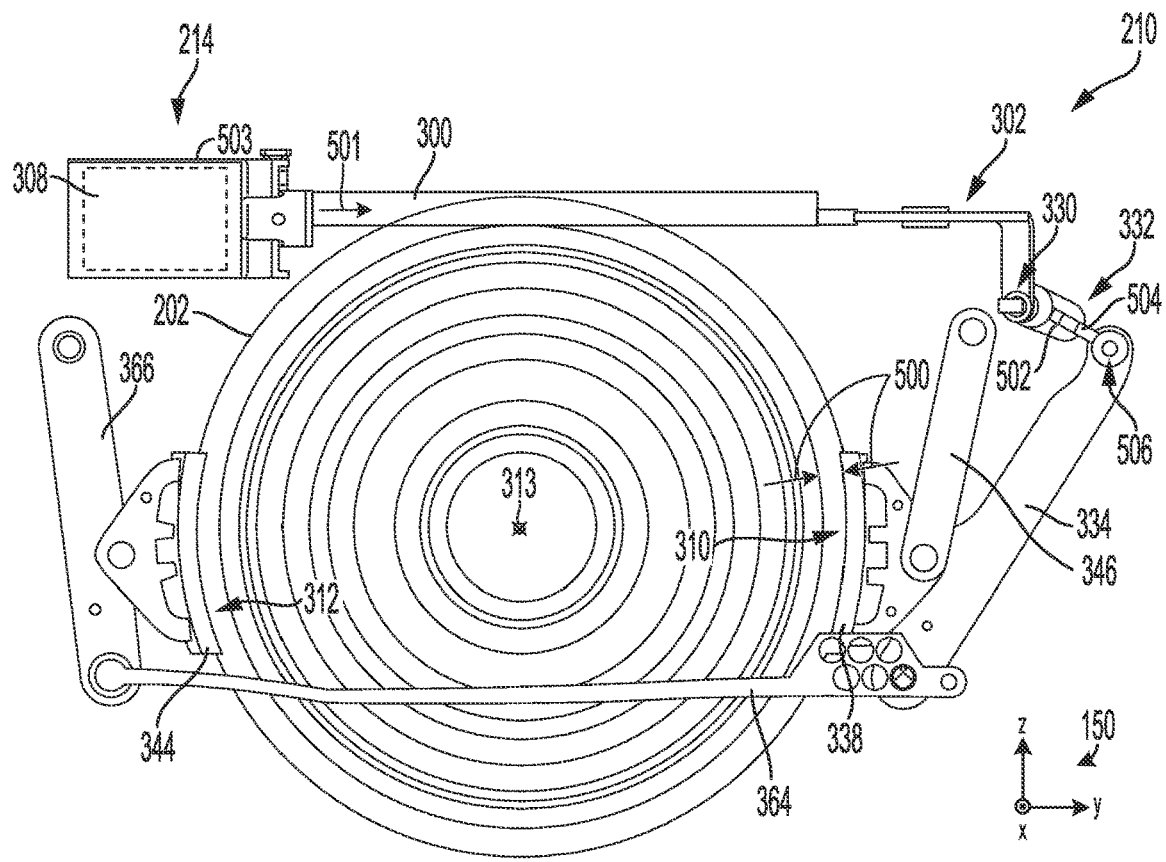
FIGS. 5-6 show side views of the brake assembly, depicted in FIGS. 3-4, in a disengaged configuration and an engaged configuration.
Figure 6:
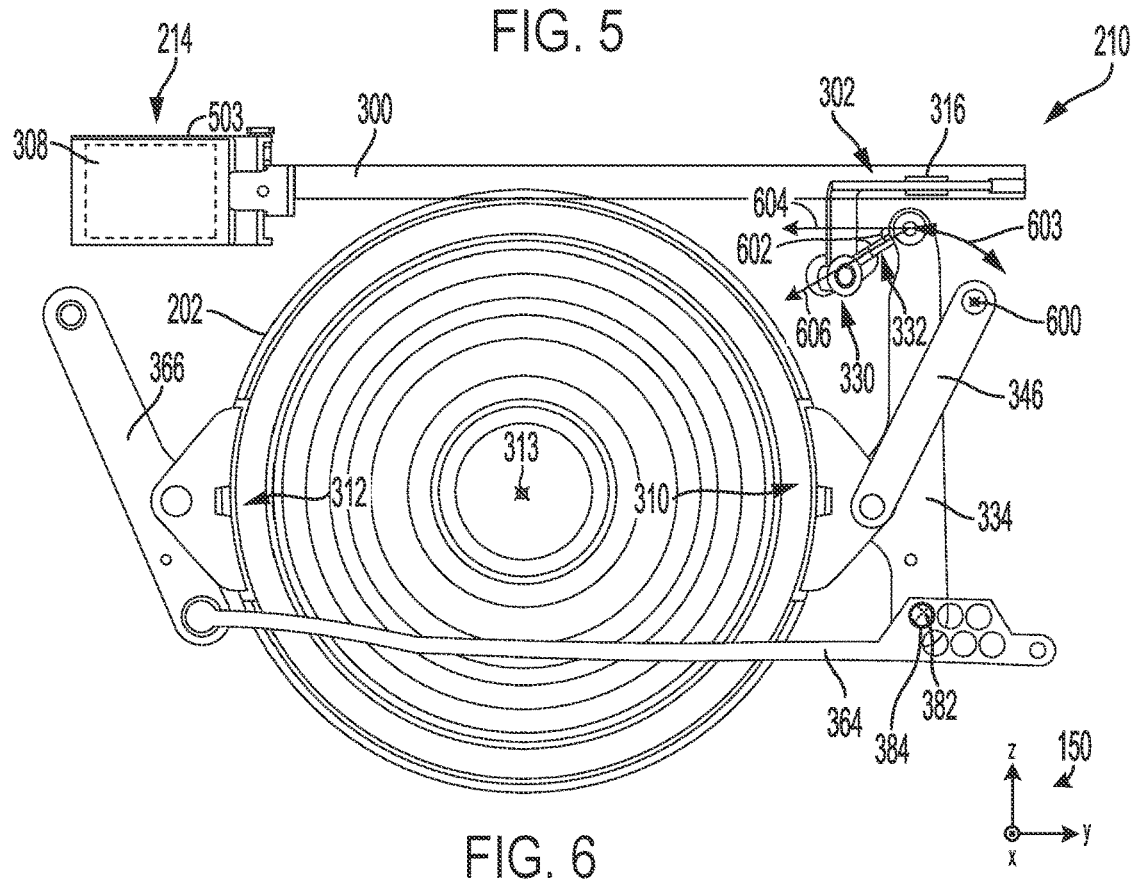

FIGS. 5-6 illustrate a side view of the brake assembly 210 in a disengaged and an engaged configuration, respectively. Specifically, FIG. 5 shows the assembly with a wheel and a newer brake shoe that is less worn, while FIG. 6 shows the brake assembly with a worn brake shoe and wheel. In the illustrated example, the brake assembly 210 includes the brake cylinder 214 which may be designed to receive pressurized air from pneumatic conduits (e.g., the pneumatic conduits 108, shown in FIG. 1), as discussed above.

Turning specifically to FIG. 5, depicting the brake assembly 210 in the disengaged configuration. In the disengaged configuration the first and second brake components 310, 312 may be spaced away from the wheel 202. Thus, a wheel-shoe gap 500 is present in the disengaged configuration. The wheel-shoe gap may represent the radial distance between the brake lining of the brake shoe and a section of the wheel contacted by the lining during braking. The brake assembly 210 including the lever attachment interface 330 pivotally coupled with two degrees of freedom to the joint 332 between the first lever 302 and the second lever 334 is again depicted. As illustrated, the joint 332 may be a chain link connection where a first chain link 502 may be pivotally engaged with a second chain link 504. Further, the first and second chain links 502, 504 may have a curved cross-section (e.g., oval or round) to enable the links to smoothly move during brake actuation. However, other types of joints such as hooks, linkage arms with bearings, and the like may be utilized, in other examples.

Figure 7:
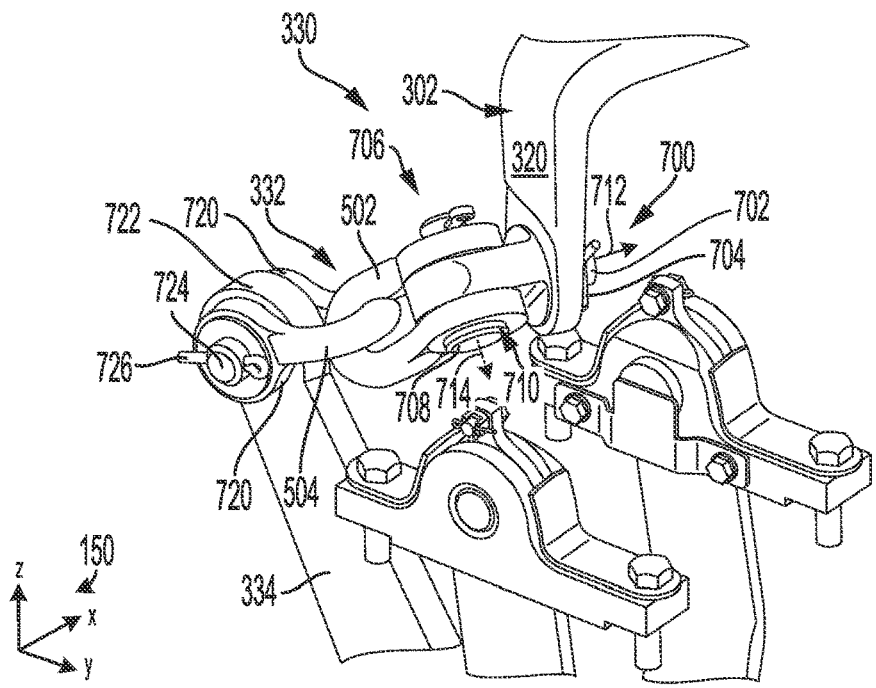
FIG. 7 shows a detailed view of a lever attachment interface in the brake assembly, depicted in FIGS. 3-4.

The lever attachment interface 330 may include a first rotational mechanism 700, shown in FIG. 7, including a first pin 702 and a first bushing 704 and a second rotational mechanism 706, shown in FIG. 7, having a second pin 708 and second bushing 710. However, in other embodiments, rotational mechanisms such as bearings (e.g., roller bearing, ball bearings, and the like) may be additionally or alternatively used in the lever attachment interface.

Continuing with FIG. 5, the pneumatically operated brake cylinder 214 may be coupled to the first lever 302 and designed to engage/disengage the first and second brake components 310, 312. As previously discussed, the brake cylinder 214 may include the automatic slack adjuster 308 configured to automatically advance the pushrod 300 in the brake cylinder 214 based on the wear of the linings 338, 344 in the first and second brake components 310, 312. To elaborate, the automatic slack adjuster 308 may be configured to move the pushrod 300 in a direction 501 away from the brake cylinder body 503 as the brake shoes wear to decrease the wheel-shoe gap 500.

Integrating the slack adjuster into the brake cylinder can increase the throw of the second lever 334. Put another way, the length of the arc of an upper side 506 of the second lever 334 traced during brake actuation is increased when the slack adjuster is integrated into the brake cylinder. Therefore, it may be desirable to allow the lever attachment interface 330 to pivot about two distinct axes to achieve two degrees of freedom. This multi-axis interface allows the line of action of the actuation force to more closely align with tangents to the second lever's arc during actuation. These lever attachment interface features are expanded upon herein with regard to FIGS. 7-8. The brake body links 346, 366, the lower links 364, and the second brake component 312 in the brake assembly 210 are again illustrated in FIG. 5.

Conversely, FIG. 6 depicts the brake assembly 210 in the engaged configuration. In the engaged configuration the pneumatically operated brake cylinder 214 advances the pushrod 300 to allow the first lever 302 to rotate about pivot 316. In turn, the lever attachment interface 330 and the joint 332 swing toward the wheel 202. Movement of the lever attachment interface 330 and the joint 332 in this manner pulls the second lever 334 in a rotational direction (counterclockwise direction, in the frame of reference of FIG. 6), which moves the first brake component 310 into frictional engagement with the wheel 202. Correspondingly, due to the attachment of the lower links 364 to the brake body link 366 on which the second brake component 312 pivotally resides, the second brake component 312 frictionally engages the wheel 202 during brake engagement. In this way, both brake components may be engaged in unison to decrease wheel speed. However, braking systems with one brake shoe have been contemplated, which may exhibit decreased braking force. Additionally, during braking, the brake body links 346 pivot about an axis 600 as brake engagement progresses.

Brake assembly kinematics occurring during a transition into the engaged configuration may however be varied, in other examples. For instance, the brake assembly may include additional levers and/or pivots that allow the system to achieve varying amounts mechanical advantage. The amount of mechanical advantage in the brake assembly may be selected based on vehicle weight, expected vehicle speed, expected vehicle payload, vehicle packaging, and the like.

The automatic slack adjuster 308 is shown in FIG. 6. As previously mentioned, the automatic slack adjuster 308 moves the pushrod 300 away from the cylinder body 503 to decrease brake throw during brake engagement. Brake lag may be consequently diminished. FIG. 6 further shows the lower links 364 with the pin 382 positioned in a different one of the openings 384 to manually decrease brake throw. In this way, the lower links 364 may be manually reconfigured for slack adjustment. However, in other examples, the manual slack adjustment may not be performed and the brake assembly may rely on the automatic slack adjuster to decrease brake throw.

As mentioned above, the lever attachment interface 330 may be pivotally coupled with two degrees of freedom to the joint 332 between the first lever 302 and second lever 334. The two degrees of freedom helps the joint 332 achieve a desired alignment with the second lever 334 as the lever moves through its travel during brake engagement/disengagement. In other words, the lever attachment interface 330 may be designed to be more compliant and less kinematically constrained to reduce losses in the brake assembly. For instance, a lever actuation angle 602, which is to say the direction of the actuation force, may be more closely aligned with the tangents of the arc 603 of the first lever 302. The actuation angle 602 may be measured from a horizontal axis 604 and a line 606 parallel to a longitudinal axis of the joint 332 (e.g., the second chain link in the joint). More closely aligning the actuation angle 602 with the tangent of the arc 603 of first lever 302 arc increases braking efficiency by decreasing losses in the brake assembly. Hence, the braking force generated by the brake system 207 may be increased or the axial input force provided by the brake cylinder 214 may be reduced while achieving a braking force at the wheel 202 equivalent to more inefficient brake systems, for instance. In one example, an angular deviation between the actuation angle 602 and a line tangent to the rotational arc 603 of the second lever 334 may be less than or equal to 20°. In this way, the brake rigging's efficiency is increased by decreasing brake engagement losses in comparison to a brake rigging with a single degree of freedom.

FIG. 7 depicts a detailed view of the lever attachment interface 330 and the joint 332. As previously discussed, the lever attachment interface 330 may be pivotally coupled with two degrees of freedom to the joint 332 between the first lever 302 and second lever 334 via the first rotational mechanism 700 and the second rotational mechanism 706. In the illustrated example, a rotational axis 712 of the first rotational mechanism 700 is perpendicular to a rotational axis 714 of the second rotational mechanism 706. Thus, central axes of the first pin 702 and the second pin 708 may be perpendicular to one another, in some instances. In this way, the lever attachment interface 330 may have a wider range of motion as it moves through its travel, enabling parasitic losses in the system to be reduced. However, non-perpendicular arrangements of the rotational mechanisms in the lever attachment interface have been envisioned. Thus, more generally the rotational mechanisms may be arranged at a non-parallel angle with regard to one another. For instance, the rotational axes of the rotational mechanisms may be arranged at an angle between 60°-80°, in one use-case example. However, arranging the axes at perpendicular angle allows the attachment interface to achieve greater rotational freedom.

In the first rotational mechanism 700, the first pin 702 may be mated with the first bushing 704 in an opening of the third section 320 of the first lever 302. Likewise, in the second rotational mechanism 706, the second pin 708 may be mated with the second bushing 710. The joint 332 may include the first chain link 502 coupled to the second chain link 504. However, in other examples, the joint may have other components such as additional links. The second chain link 504 may include two sections 720 (e.g., U-shaped sections) with a recess between the sections. An end 722 of the second lever 334 may be positioned in the recess. A pin 724 may extend through openings in the end 722 of the second lever 334 and the sections 720 of the second chain link 504 to pivotally attach the second chain link to the second lever. However, other pivotal attachment techniques may be used, in other examples.

FIG. 7 shows retaining clips 726 extending through pins 702, 708, and 724. The retaining clips 726 serve to reduce the likelihood of unwanted pin and bushing movement (e.g., disengagement). However, nuts or other suitable retaining devices may, additionally or alternatively, be used to secure the pins in the bushings. Further in other embodiments, one or more of the retaining clips may be omitted from the brake assembly.

Figure 8:
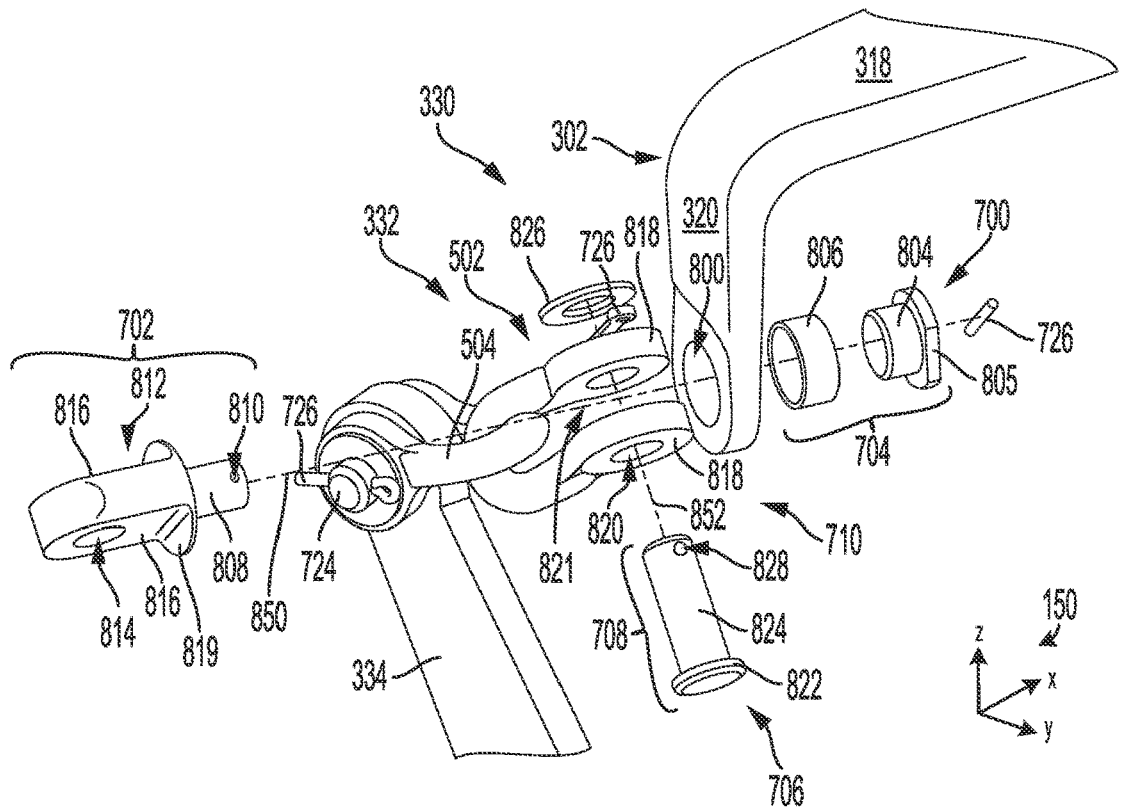
FIG. 8 shows an exploded view of the lever attachment interface, depicted in FIG. 7.

FIG. 8 depicts an exploded view of the lever attachment interface 330. As previously discussed, the lever attachment interface 330 may include the first rotational mechanism 700. The first rotational mechanism 700 may attach to the first lever 302 via an opening 800 in the first lever 302 (e.g., the third section 320 of the first lever). The third section 320 extends downward from the second section 318 forming an L-shape. However, other arrangements of the first lever 302 may be used.

The first rotational mechanism 700 may include the first bushing 704 having an inner sleeve 804 mating with an outer sleeve 806. The inner sleeve 804 may include a flange 805 radially extending therefrom to axially delimit the sleeve when assembled. However, in other arrangements, the first rotational mechanism 700 may have other configurations such as an arrangement with one bushing sleeve. When assembled, a cylindrical section 808 of the first pin 702 mates with the inner sleeve 804.

When the attachment interface is assembled, the retaining clip 726 may be mated with an opening 810 in the first pin 702. The first pin 702 may further include an extension 812 extending axially away from the cylindrical section 808. Further, the extension 812 may include two opposing faces 816 (e.g., planar faces) designed to mate with sections 818 of the first chain link 502 including openings 820. The opposing faces 816 of the extension 812 may be parallel to one another. Correspondingly, the first chain link 502 may be U-shaped with two sections 818 spaced away from one another and arranged substantially parallel to one another. The sections 818 of the first chain link 502 may have an annular shape to achieve a compact arrangement, in some cases. However, in other embodiments, the first chain link 502 may form a closed shape with two sections including bushing openings. A flange 819 may be arranged between the extension 812 and the cylindrical section 808 of the first pin 702 to axially delimit the first pin, when installed. However, in other examples, the flange may be omitted from the first pin 702.

The openings 814, 820 may form the second bushing 710 of the second rotational mechanism 706. The second pin 708 of the second rotational mechanism 706 is shown in FIG. 8. When assembled, the extension 812 of the first pin 702 slides into the space 821 between the sections 818 of the first chain link 502 and the second pin 708 mates with the openings 820 in the first chain link 502 as well as the opening 814 in the extension of the first pin. In this way, a space efficient rotational interface is formed. The central axes of the openings 820, 814 (e.g., cylindrical openings) may be aligned when the attachment interface is assembled to allow the second pin 708 to mate with these openings. Central axes 850, 852 along which the first pin 702 and the second pin 708 respectively traverse during assembly are further provided for reference in FIG. 8.

The second pin 708 may further include a head 822 having a larger diameter than a body 824 (e.g., cylindrical shaped body) of the pin, enabling the pin to maintain a desired axial positioned when assembled. However, in other examples, the second pin 708 may have a substantially constant diameter along its length. A washer 826 may further be included in the lever attachment interface 330, in some embodiments. The washer 826 can allow for a desired axial positon of the second pin 708 to be achieved. One of the retaining clips 726 designed to mate with an opening 828 in the second pin 708 may be included in the attachment interface.

The pin 724 coupling the second chain link 504 to the second lever 334 is further shown in FIG. 8. The pin 724 may be mated with openings in the second chain link 504 as well as the second lever 334 to enable rotational attachment there between.

Figure 9:
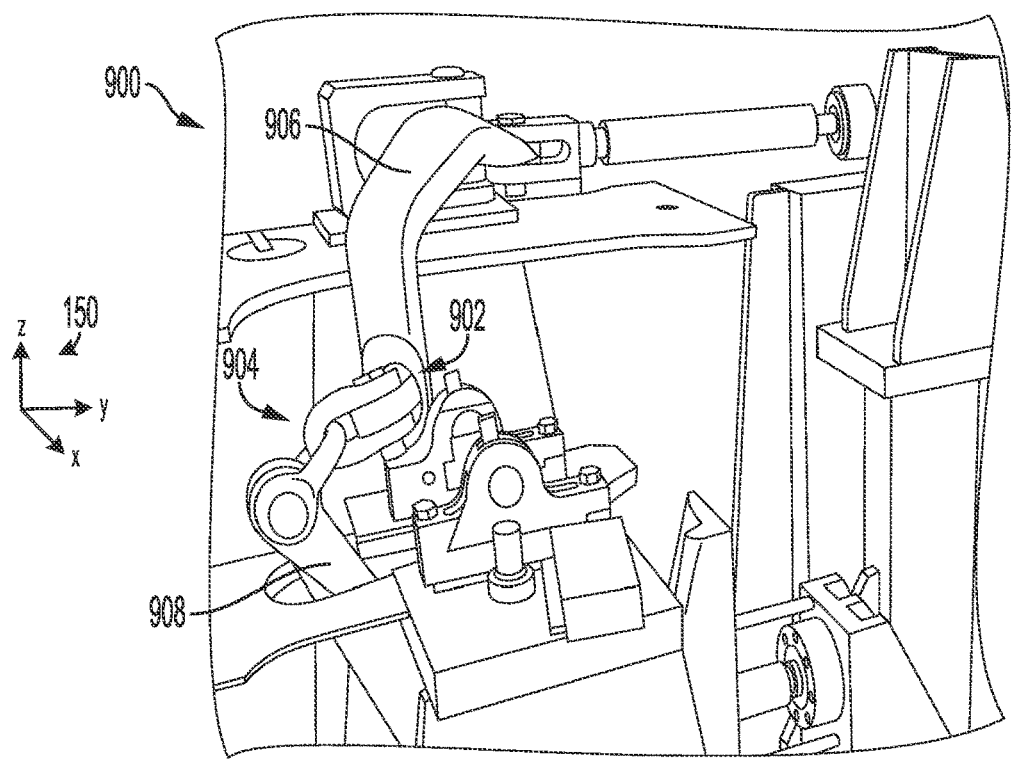
FIGS. 9-10 show different views of an illustration of a use-case mock-up of a brake assembly.
Figure 10:
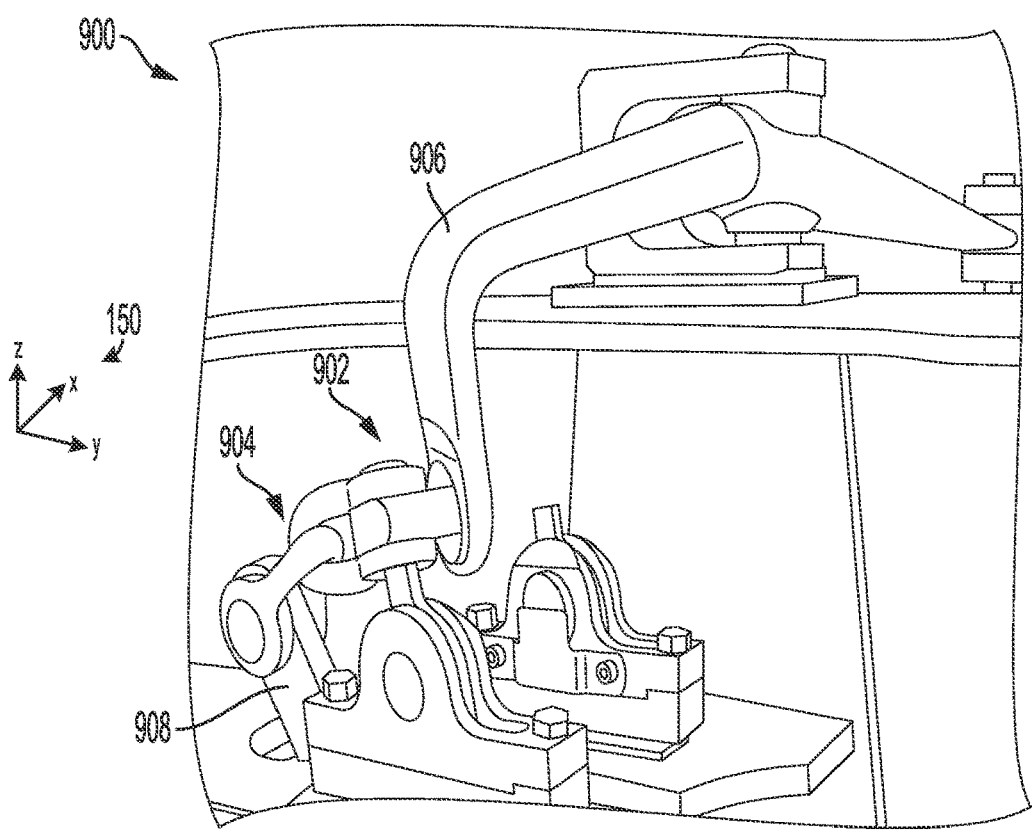

FIGS. 9 and 10 illustrate a use-case mock-up of a brake assembly 900. The brake assembly 900 again includes a lever attachment interface 902 pivotally coupled to a joint 904 with two degrees of freedom to a first lever 906 and a second lever 908. Thus, the brake assembly 900 may have at least a portion of the structural and functional features of the brake assembly 210, shown in FIGS. 2-8. It was found through testing of the mock-up of the brake assembly 900 that the brake efficiency of the assembly was increased due to the two degrees of freedom of movement exhibited by the lever attachment interface 902. Testing of the brake assembly confirmed that the chance of the brake assembly 900 locking up during use is significantly decreased and avoided in certain scenarios.

In one embodiment, at least a portion of the components in the brake assembly 900, as well as the other assemblies described herein, may be constructed out of a metal alloy. For instance, the first lever 906 and the second lever 908 may be constructed out of steel, aluminum, or combinations thereof, in one example. The chain links, pins, and levers may be constructed out of steel, aluminum, or combinations thereof, in some embodiments.

The bushings (e.g., bushing sleeves) in the lever attachment interface 902 may be constructed out of brass to allow the bushings to wear during used and reduce the likelihood of wear to the pins in the interface. However, the bushings may be constructed out of steel, in other examples. The material construction of the brake assembly components may be selected based on factors such as cost, strength to weight ratio, abrasion resistance, expected component loading, and the like. For example, steel may be used due to its lower cost and greater durability than aluminum, in some instances. Conversely, aluminum may be used, in certain scenarios where a higher strength to weight ratio material is desired. Still further in other examples, at least a portion of the brake assembly components may be at least partially constructed out of composite materials to reduce the weight of the brake assembly.

Figure 11:
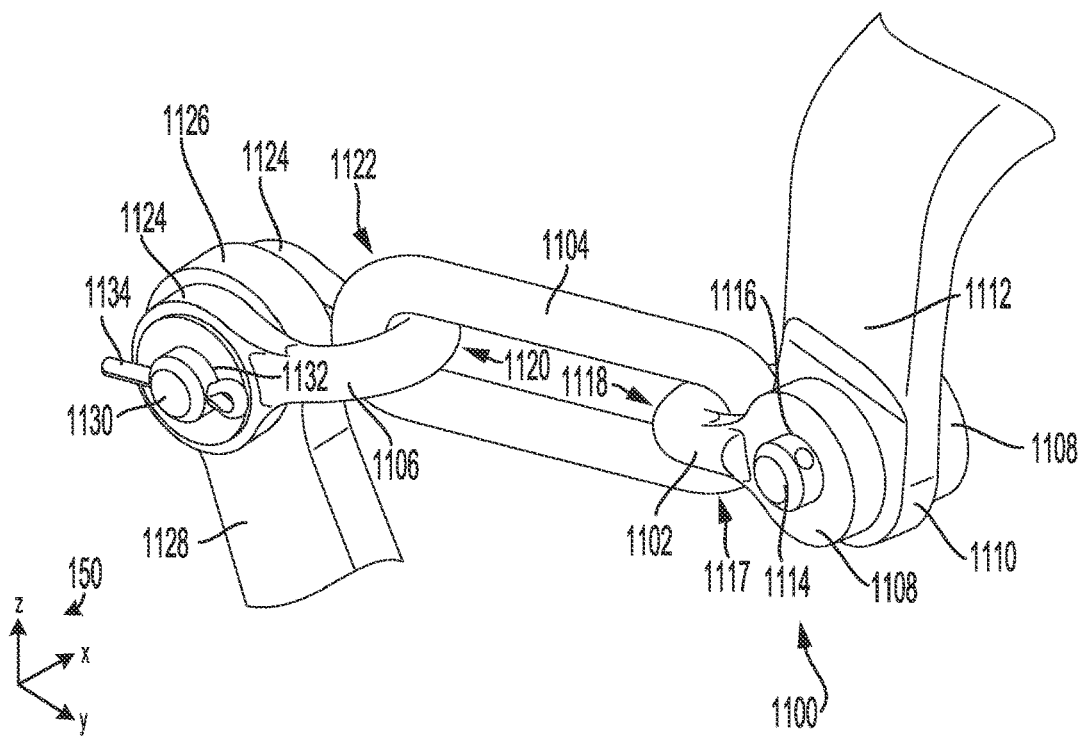
FIG. 11 shows a second embodiment of a lever attachment interface in a brake assembly.

FIG. 11 illustrates another embodiment of a lever attachment interface 1100. The lever attachment interface 1100, shown in FIG. 11, serves as an alternate embodiment of the lever attachment interface 330 and joint 332, shown in FIGS. 2-8. As such, the lever attachment interface 1100 may be included in a brake assembly, such as the brake assembly 210, shown in FIGS. 2-8.

In the illustrated embodiment, the lever attachment interface 1100 has a triple link arrangement. Specifically, the lever attachment interface 1100 may include a first chain link 1102, a second chain link 1104, and a third chain link 1106 that are sequentially interconnected. The first chain link 1102 may include two sections 1108 (e.g., U-shaped sections) spaced away from one another with a recess there between in which an end 1110 of a first lever 1112 is positioned. A bushing 1114 may extend through openings 1116 in the sections 1108 of the first chain link 1102 and the first lever 1112. In this way, the first chain link 1102 may be pivotally attached to the first lever 1112. However, a ball or roller bearing may be used to form the pivotal attachment, in other examples.

In the illustrated embodiment, the second chain link 1104 forms a continuous shape (e.g., oval shape) with a first curved end 1117 coupled to a curved section 1118 of the first chain link 1102. However, in other embodiments, the third chain link may include discrete sections joined at a pivot, for instance. The second chain link 1104 further includes a second curved end 1120 coupled to a curved section 1122 of the third chain link 1106. Coupling the chain links in this manner allows the interface to achieve greater kinematic compliance during brake actuation, thereby reducing losses in the system during braking, as previously discussed.

As shown in FIG. 11, the third chain link 1106 may include two sections 1124 with a recess having an end 1126 of a second lever 1128 positioned therein. Additionally, a pin 1130 may extend through openings 1132 in the second lever 1128 and the sections 1124 of the third chain link 1106 to facilitate pivotal attachment between the third chain link 1106 and the second lever 1128. However, in other examples, a bearing may be used for this pivotal attachment. A retaining clip 1134 may extend through an opening in the pin 1130 to secure the pin in a desired position. However, other suitable retaining devices such as bolts and/or flanges may be used or the retaining clip may be omitted from the assembly, in some cases. The first lever 1112 may be actuated via a brake cylinder. In turn, the attachment interface 1100 moves the second lever 1128 to induce braking action in the system's brake shoes.

The embodiment of the lever attachment interface 1100 depicted in FIG. 11 achieves multiple degrees of freedom of movement. Furthermore, the embodiment of the lever attachment interface 1100 illustrated in FIG. 11 may have a simpler construction and operation than the other embodiments of the attachment interface described herein. Thus, the embodiment of the attachment interface, depicted in FIG. 11 may be more robust and be less costly to manufacture than the previously described interfaces. However, the embodiment of the interface illustrated in FIG. 11 is less compact than the embodiment of the attachment interface, depicted in FIGS. 2-8. As such, the embodiment of the interface shown in FIG. 11 may be used in brake systems which have fewer space constraints.

In yet another embodiment, the attachment interface may include a universal joint between the two chain links of the attachment interface. The universal joint introduces an additional degree of freedom to the brake assembly in a compact space, for instance. Specifically, in one use-case example, the universal joint may include a cross shaped piece with each of the four ends functioning as a bearing with a first chain link and a second chain link perpendicularly coupled to the bearings to allow for movement in multiple directions. However, the universal joint embodiment may be more complex and costly than the other attachment interface embodiments described herein, in certain scenarios. Furthermore, the universal joint may be more susceptible to degradation, in some cases.

Figure 12:
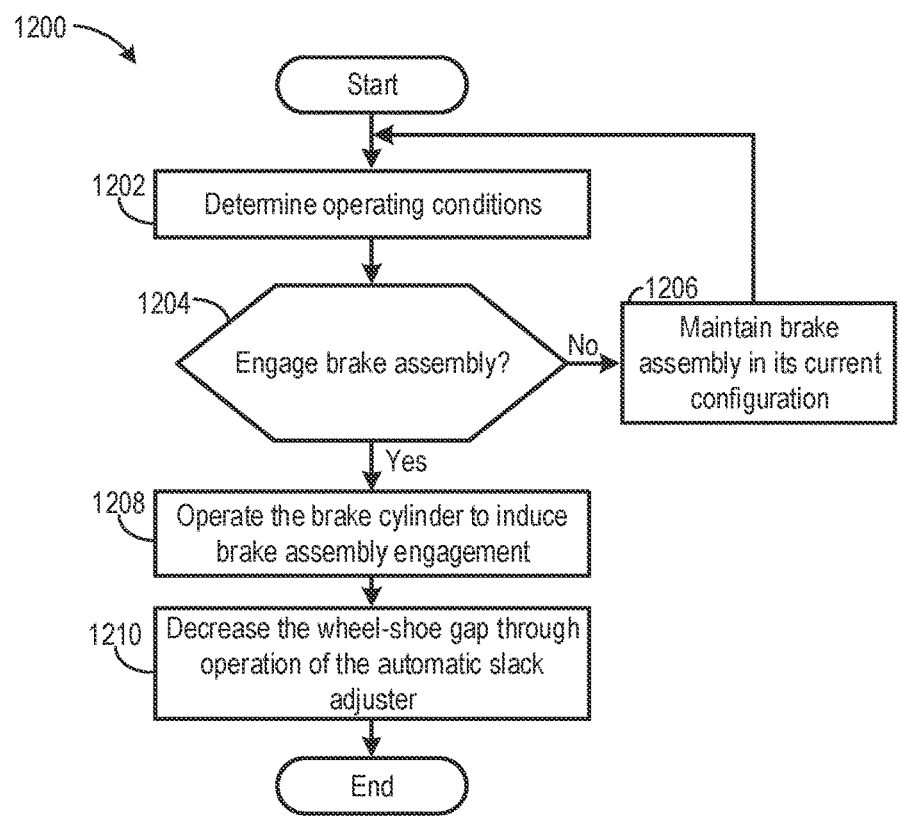
FIG. 12 shows a method for operation of a brake assembly.

FIG. 12 shows a method 1200 for operation of a brake assembly. The method 1200 may be implemented by any of the brake assemblies or combinations of the brake assemblies described above with regard to FIGS. 1-11. However, in other examples, the method may be implemented by other suitable brake assemblies. At least a portion of the method steps may be implemented as instructions stored in non-transitory memory executable by a processor in a controller (e.g., the controller 104 illustrated in FIG. 1). However, in other examples, at least a portion of the steps may be manually carried out.

At 1202, the method includes determining operating conditions. Determining operating conditions, in one example, may include gather data from sensors, modeling data, and/or accessing data from look-up tables. The operating conditions may include vehicle speed, desired vehicle speed, brake shoe position, pushrod position, brake cylinder air pressure, and the like.

Next at 1204, the method includes determining whether to engage the brake assembly or not. Such a determination may be based on a brake command received from a brake interface, a brake command automatically generated by the controller based on desired vehicle speed and current vehicle speed, and the like. For instance, if an actual wheel or vehicle speed deviates from a desired wheel or vehicle speed by a predetermined amount, the brake assembly may be engaged. However, in alternate examples, the brake assembly may be manually engaged and disengaged.

If it is determined that brake engagement is not desired (NO at 1204) the method moves to 1206 where the method includes maintaining the brake assembly in its current configuration (e.g., a disengaged configuration).

Conversely, if it is determined that brake engagement is desired (YES at 1204) the method moves to 1208. At 1208, the method includes operating the brake cylinder to induce brake system engagement. Brake system engagement may include pivoting a first lever about a point of rotation which conversely moves the lever attachment interface in an engagement direction. In turn, the second lever pivots about its axis of rotation to engage a pair of brake components (e.g., brake shoes) in the braking system responsive to movement of the lever attachment interface. As previously discussed, the lever attachment interface is allowed to rotate about two distinct axes, thereby exhibiting two degrees of freedom. In this way, the angular arrangement of the lever attachment interface may more closely match the arc of rotation of the second lever during actuation. Losses in the brake system may be reduced as a result.

In some examples, the method may further include at 1210, periodically decreasing the wheel-shoe gap in the brake system through operation of the automatic slack adjuster integrated into the brake cylinder. Thus, the automatic slack adjuster may periodically ratchet the pushrod axially away from the body of the brake cylinder as the brake shoe wears.

In another aspect, a method for operation of a brake assembly is provided. The method includes actuating a brake cylinder to induce movement of a first lever in an engagement direction which drives movement of a lever attachment interface pivotally coupled with two degrees of freedom to the first lever and a second lever, and movement of the lever attachment interface drives movement of the second lever which activates engagement between a brake shoe and a wheel.

The technical effect of the method for brake assembly operation is an increase in braking efficiency of the brake assembly. Another technical effect of the method for brake assembly operation is a reduction in brake actuation delays through the use of the automatic slack adjuster.

In another representation, a brake rigging in a railcar bogie is provided that includes a live lever configured to receive actuation input from a pneumatic brake cylinder, a pivotal assembly pivotally connected to the live lever and an interconnected chain link pair with an interface having two distinct axes of rotation, the chain link pair pivotally connected to a cross-over lever configured to interact with a brake shoe to induce frictionally interaction between the brake shoe and a wheel of the railcar bogie during braking operation.

FIGS. 1-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and proceeded with the word "a" or "an" should be understood as not excluding plural of said elements or steps, unless such exclusion is explicitly stated. References to "one embodiment" or "one example" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property. The terms "including" and "in which" are used as the plain-language equivalents of the respective terms "comprising" and "wherein." Moreover, the terms "first," "second," and "third," etc., are used merely as labels, and are not intended to impose numerical requirements or a particular positional order on their objects.

This written description uses examples to disclose the invention and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be combined by one of ordinary skill in the art to construct additional embodiments and techniques in accordance with principles of this application.

The invention claimed is:

1. A brake assembly, comprising:
a lever attachment interface pivotally coupled with two degrees of freedom to a joint between a first lever and a second lever; and
a brake cylinder comprising a slack adjuster, the brake cylinder coupled to a first end of the first lever via a pushrod and configured to engage and disengage a brake lining in a brake component via the slack adjuster;
wherein the slack adjuster is configured to move the pushrod and the first end of the first lever outward from the brake cylinder along a central axis defined by the brake cylinder as the brake lining wears to adjust a throw of the second lever.

2. The brake assembly of claim 1, wherein the lever attachment interface comprises:
a first rotational mechanism including a first pin and a first bushing; and
a second rotational mechanism including a second pin and a second bushing, wherein the lever attachment interface comprises two distinct axes of rotation.

3. The brake assembly of claim 2, wherein a rotational axis of the first rotational mechanism is arranged at a non-parallel angle to a rotational axis of the second rotational mechanism.

4. The brake assembly of claim 2, wherein a rotational axis of the first rotational mechanism is perpendicular to a rotational axis of the second rotational mechanism.

5. The brake assembly of claim 2, wherein the first bushing is included in an end of the first lever and wherein the first pin includes:
a first side extending through the first bushing; and
a second side including an opening forming a portion of the second bushing.

6. The brake assembly of claim 5, wherein the second bushing includes one or more openings in a chain link of the joint.

7. The brake assembly of claim 1, wherein the brake cylinder is pneumatically operated, and wherein the slack adjuster comprises an automatic slack adjuster comprising a ratcheting mechanism that moves the pushrod outward away from a body of the brake cylinder as a brake shoe wears, wherein the pushrod is pivotally coupled to the first lever.

8. The brake assembly of claim 1, wherein the joint includes a first chain link pivotally engaged with a second chain link.

9. A rail vehicle brake rigging, comprising:
a lever attachment interface including:
a first rotational mechanism pivotally coupled to a first lever; and
a second rotational mechanism pivotally coupled to the first rotational mechanism and a first chain link;
a second chain link interconnected with the first chain link and pivotally coupled to a second lever, wherein the second lever is coupled to a brake shoe; and
a brake cylinder comprising a slack adjuster and configured to actuate the first lever to engage and disengage the brake shoe via the slack adjuster, wherein the brake cylinder is coupled to a first end of the first lever via a pushrod, wherein the slack adjuster is configured to move the first end of the first lever outward from the brake cylinder along a central axis defined by the brake cylinder as the brake shoe wears to adjust a throw of the second lever.

10. The rail vehicle brake rigging of claim 9, wherein the lever attachment interface includes a first pin and a second pin with non-parallel central axes.

11. The rail vehicle brake rigging of claim 10, wherein the first pin and the second pin are arranged perpendicular to one another.

12. The rail vehicle brake rigging of claim 10, wherein the first pin mates with a first bushing in a section of the first lever vertically extending downward and wherein the second pin mates with a second bushing including a plurality of openings in a section of the first pin and the first chain link, and wherein the section of the first lever is pivotally coupled to the lever attachment interface.

13. The rail vehicle brake rigging of claim 10, wherein the first pin is mated with a first bushing, the first bushing including two sleeves mated with an opening in the first lever and wherein the second pin is mated with a second bushing at least partially formed by an opening an extension of the first pin.

14. The brake assembly of claim 2, wherein the brake component comprises a brake shoe.

* * * * *